United States Patent [19]

Kwon

[11] Patent Number: 4,807,065
[45] Date of Patent: Feb. 21, 1989

[54] APPARATUS FOR DRIVING LOADING GEARS IN A VIDEO CASSETTE-TAPE RECORDER

[75] Inventor: Sung T. Kwon, Suwon, Rep. of Korea

[73] Assignee: Gold Star Co., Ltd., Seoul, Rep. of Korea

[21] Appl. No.: 908,334

[22] Filed: Sep. 17, 1986

[30] Foreign Application Priority Data

Sep. 17, 1985 [KP] D.P.R. of Korea ............ 11907/1985

[51] Int. Cl.$^4$ ............................................ G11B 15/665
[52] U.S. Cl. ..................................................... 360/85
[58] Field of Search ............................................ 360/85

[56] References Cited

U.S. PATENT DOCUMENTS 4,408,236 10/1983 Murata et al. ........................ 360/85

Primary Examiner—Robert S. Tupper
Attorney, Agent, or Firm—Cushman, Darby & Cushman

[57] ABSTRACT

An apparatus for driving loading gears in a video cassette tape recorder comprising a cam with a spiral cam slot, a sector gear and an auxiliary plate. The loading gears may be rotated to the rotation of the sector gear which is rotated according as the activating plate is moved either right or left direction by the rotation of the cam.

1 Claim, 3 Drawing Sheets

APPARATUS FOR DRIVING LOADING GEARS IN A VIDEO CASSETTE-TAPE RECORDER

FIELD OF THE INVENTION

This invention relates to a loading gear driving apparatus of a video cassette-tape recorder, more particularly to a loading gear driving apparatus of simple construction in which a sector gear and an auxiliary plate are provided between a loading gear and an activating plate for modifying the modes of the loading gear.

DESCRIPTION OF THE PRIOR ART

A generally used prior driving apparatus comprises an intermediate gear provided between one of the loading gears and a lever gear each having a gear portion at one end to interlock with one another. A cam formed with spiral slots on both of its side surfaces is installed below the lever gear. The lever gear has a protruding pin adapted to engage the cam slot.

Accordingly, where the cam is rotated in accordance with the driving force, the lever gear is rotated with the protruding pin being moved along the cam slot. The intermediate gear interlocked therewith is rotated to move the loading gears. The respective loading arms attached to the loading gears are able to rotate thereabout to move respective trailers along guiding channels to respective stoppers. Guide rollers attached above the respective trailers are moved holding a cassette tape therewith, thus, enabling the cassette tape to be loaded on the peripheral surface of a head drum.

With this prior art loading gear driving apparatus, a rotation force applied to the cam is transferred to the loading gear by means of a lever gear and an intermediate gear. Also, the cam is formed with spiral slots on both sides, the slot formed on the upper surface being adapted to operate the lever gear and the slot formed on the lower surface being adapted to drive the activating plate. Furthermore, with the prior art utilizing a lever gear, this results in the cam having to reside near the loading gear, causing a restriction on the design.

SUMMARY OF THE INVENTION

The most important object of this invention is to provide a loading gear driving apparatus compatible with other component elements without restriction on the design.

The loading gear driving apparatus of the present invention is particularly novel in that a sector gear and an auxiliary plate are substituted for an intermediate gear and a lever gear. Thus, unlike the prior art, the cam positioning may be irrelevant to the position of the lever gear.

Toward this end, this invention comprises an activating plate mounted on a base plate slidably in the left or right direction and a cam. This invention is characterized in that a sector gear interlocked with the loading gear is mounted on an axial pin of the base plate. In addition, an auxiliary plate is mounted on the axial pin upon the sector gear. The sector gear and auxiliary plate each have protrusions adapted to interconnect with each other by means of a spring. The sector gear and auxiliary plate also respectively have a rectilinear contact portion and a curved engaging portion so that an engaging pin on the activating plate may be engaged into a recess formed therebetween.

BRIEF DESCRIPTION OF THE DRAWINGS

Further objects of this invention will become obvious upon an understanding of the illustrative embodiment described in connection with the accompanying drawings herein.

BEST MODE OF CARRYING OUT THE INVENTION

Figure 1:
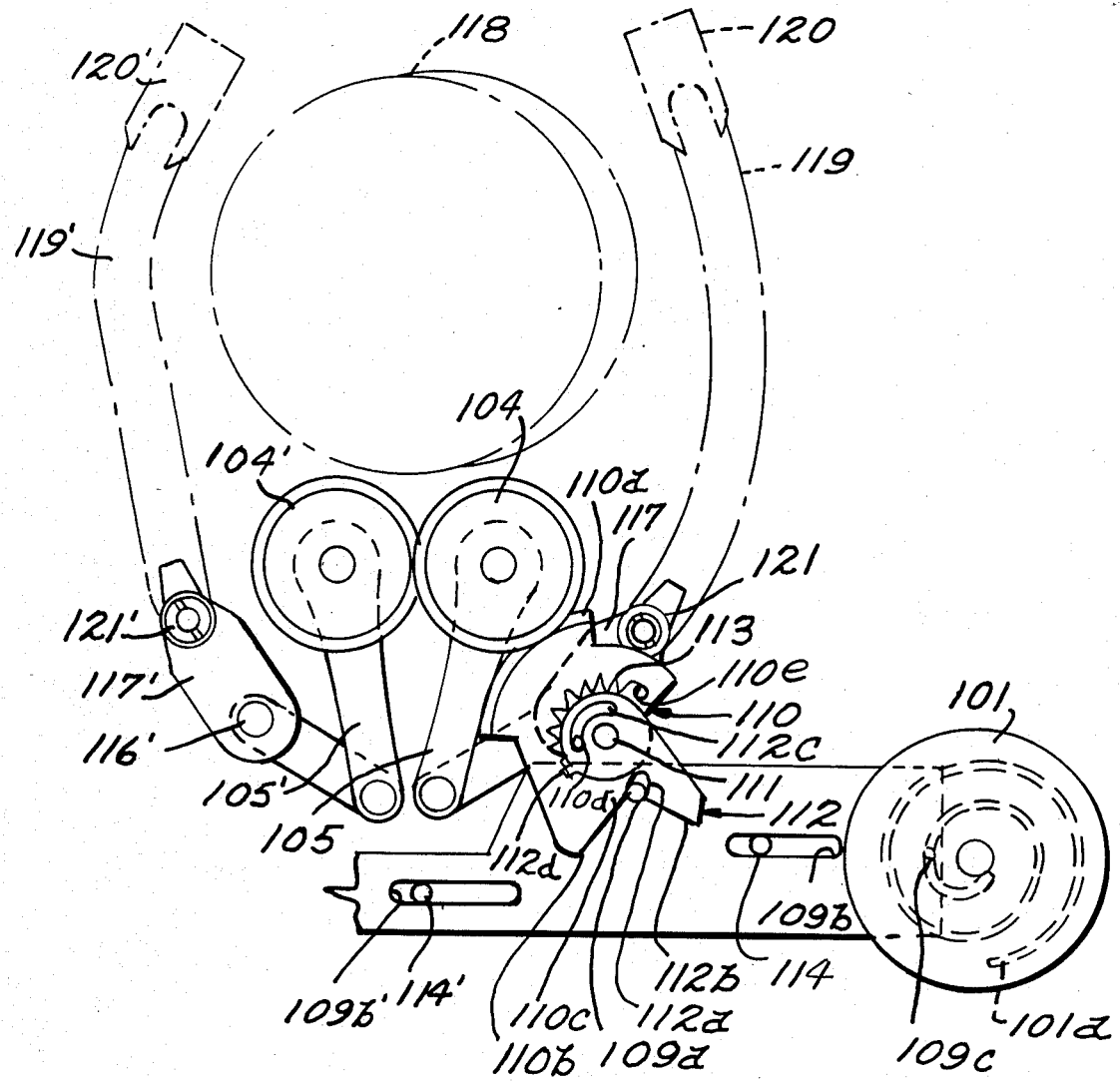
FIG. 1 is a fragmentary plan view showing a tape unloading state of the present invention.

The preferred embodiment of this invention will be described in reference to FIGS. 1-3. Referring to FIG. 1, there is shown an unloading state of the present invention. An activating plate 109 is moved toward the right with an engaging pin 109 being moved along a cam slot 101a of a cam 101 according to the rotation of the latter. Therefore, a sector gear 110 can be rotated counterclockwise by means of an engaging pin 109a fixed on the activating plate 109 with assistance of an auxiliary plate 112 and a coil spring 113 so that the loading gears 104 and 104' interlocked therewith may be rotated. The cam 101 is provided with a spiral slot 101a on the lower surface which is adapted to engage an engaging pin 109c of the activating plate 109. The activating plate 109 is also provided with guiding slots 109b and 109b' adapted to mount on guiding pins 114 and 114'. respectively, fixed on the base plate so that the activating plate 109 may be moved slidably.

The sector gear 110 is provided with a gear portion 110a adapted to interlock with the loading gear 104, and is provided with a rectilinear contact portion 110b and a curved engaging portion 110c. Mounted on an axial pin 111 upon the sector gear 110 is an auxiliary plate 112 also having a curved engaging portion 112a and a rectilinear contact portion 112b. Thereby, the engaging pin 109a may be engaged into the position formed between the curved engaging portions 110c and 112a. Furthermore, the auxiliary plate 112 is provided with an arcuate slot 112c adapted to slidably engage a guiding pin 110d on the sector gear 110. The auxiliary plate 112 is also provided with a protrusion 112d on the peripheral surface to interconnect with a protrusion 110e on the sector gear 110 by means of the coil spring 113.

If the cam 101 is rotated counterclockwise according to a driving force and the activating plate 109 is moved toward the left, the engaging pin 109a fixed on the activating plate thrusts the engaging portion 110c so that the sector gear 110 may be rotated clockwise with the axial pin 111 in the center. Accordingly, the loading gear 104 interlocked with the sector gear 110 and the loading gear 104' interlocked with the former may be rotated counterclockwise and clockwise, respectively, so that the loading arms 105 and 105' respectively fixed on the loading gears 104 and 104' may be driven. At that time, guide rollers 121 and 121' respectively connected to the loading arms 105 and 105' go to stoppers 120 and 120' holding a tape in order to load the tape on the peripheral surface of the head drum 118, resulting in the loading position.

Figure 2:
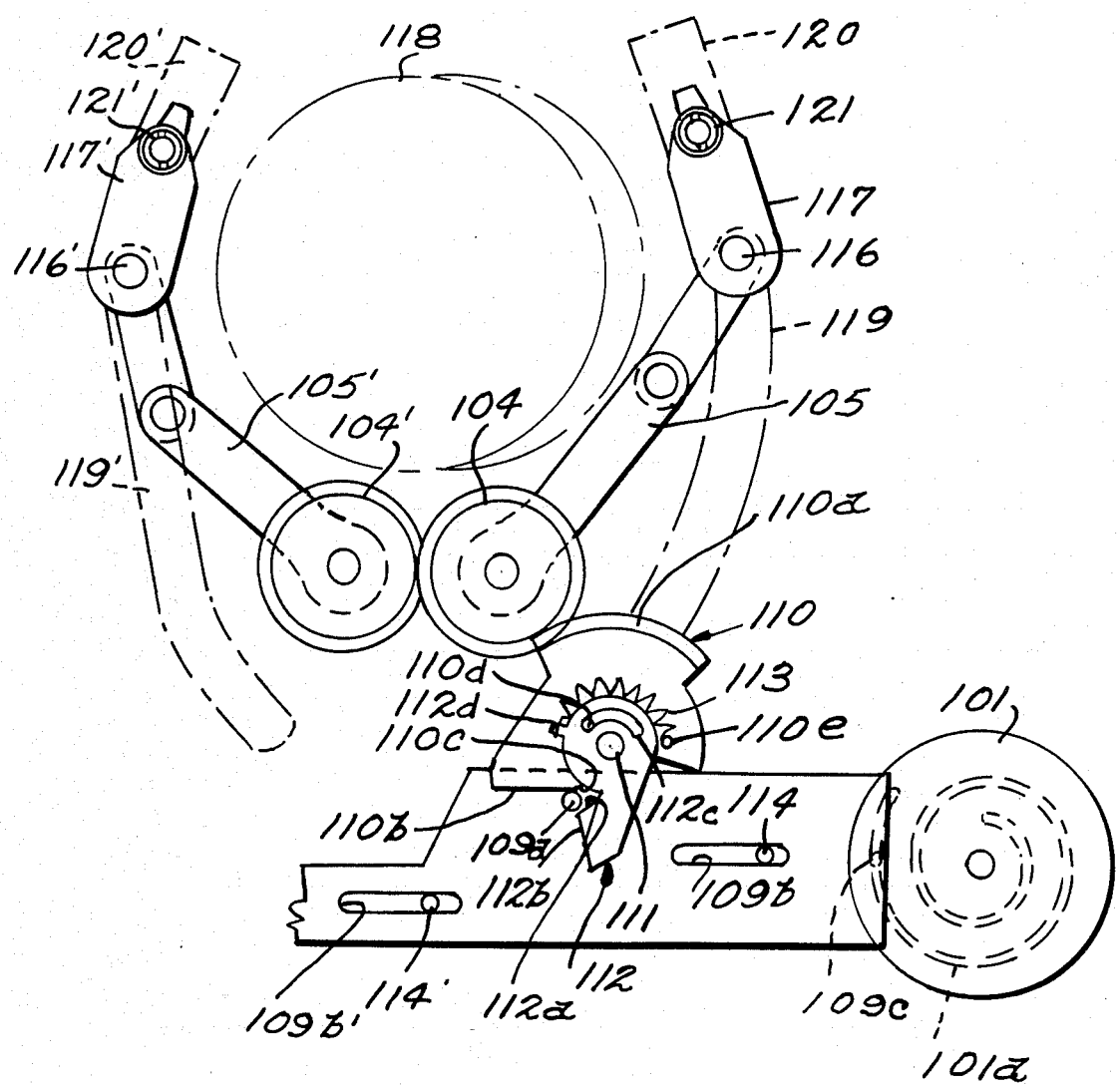
FIG. 2 is similar to FIG. 1 except for the activating plate being moved toward the left for play, F.F. or rewind mode after the loading state.

FIG. 2 shows that the activating plate 109 moved toward the left to effect a play, rewind or F.F. mode after the tape loading state (not shown). Even if the activating plate moves further toward the left from the tape loading state, the recorder remains in the loading state because the engaging pin 109a of the activating plate 109 is contacting the rectilinear contact portion 110b and thereby the sector gear 110 is stationary.

If the tape loading state is converted to the tape unloading state, the cam 101 is rotated clockwise and the activating plate 109 is moved toward the right so that the engaging pin 109a of the activating plate 109 thrusts the engaging portion 112a of the auxiliary plate 112 to rotate the sector gear 110 which is forced to rotate by means of the coil spring 113. Thereby, the loading gears 104 and 104' and the loading arms 105 and 105' are rotated to result in the state shown in FIG. 1.

Figure 3:
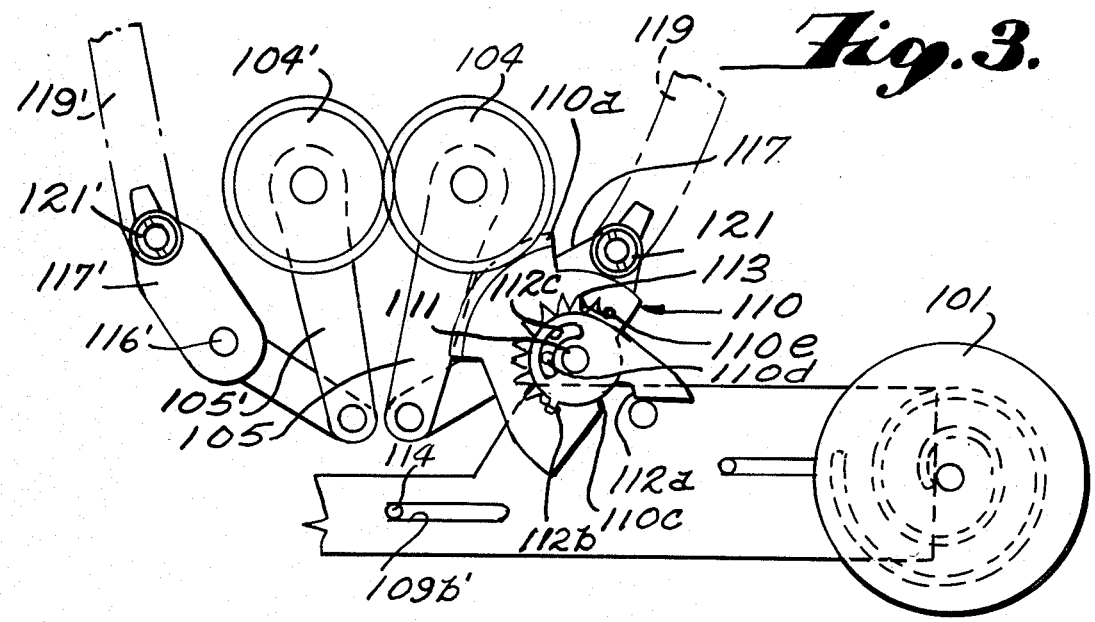
FIG. 3 is similar to FIGS. 1 and 2 except for the activating plate further being moved toward the right from the unloading state shown in FIG. 1 for effecting an eject mode.
Figure 4:
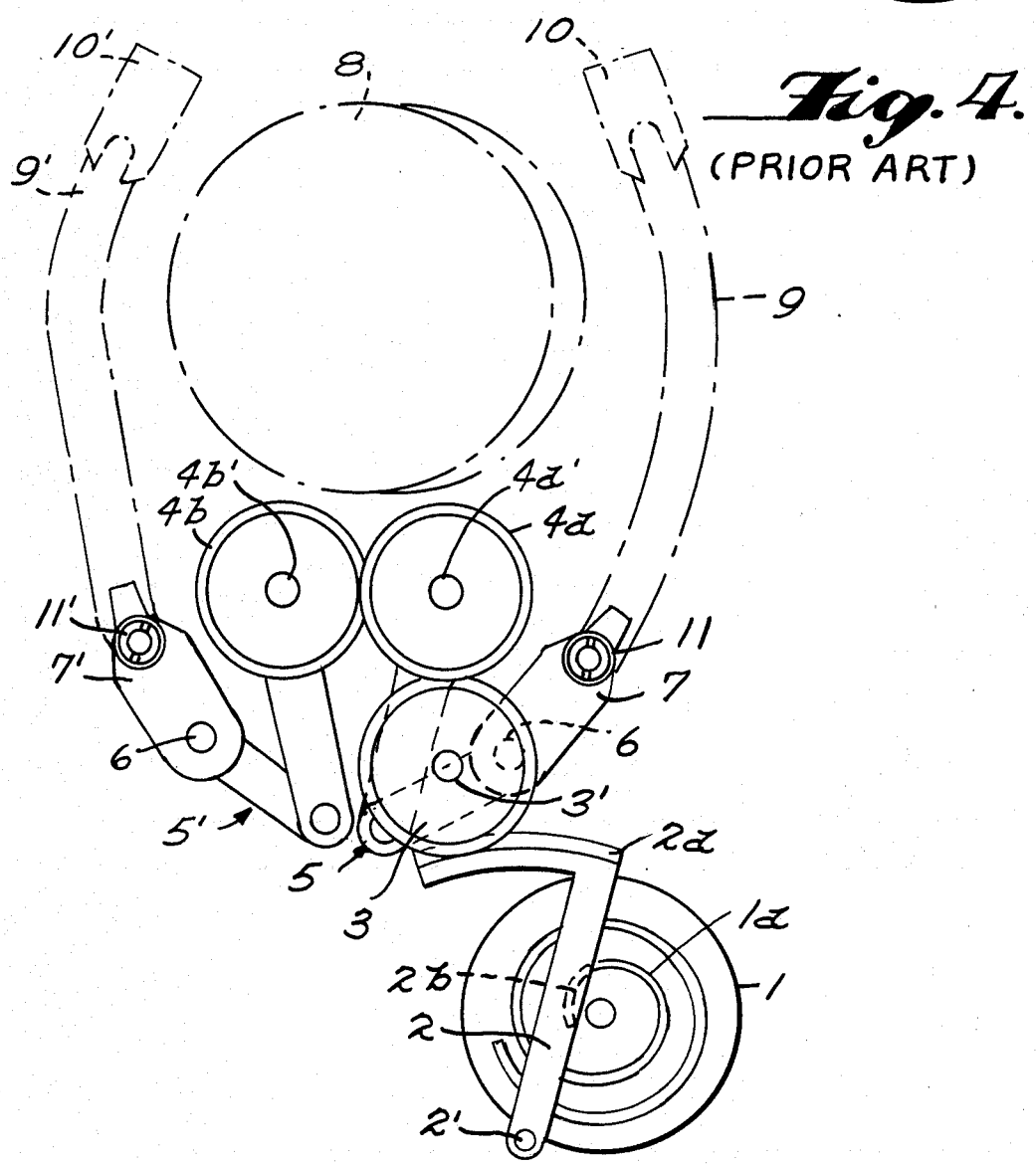
FIG. 4 is a fragmentary plan view of the prior art.

FIG. 3 shows that the activating plate 109 is further moved toward the right from the unloading state shouwn in FIG. 1, to effect an eject mode. At that time, since the engaging pin 109a is contacting the rectilinear contact portion 112b, the sector gear 110 is not rotated any more and is stationary.

As set forth hereinabove, the present invention substitutes a sector gear and an auxiliary plate for an intermediate gear and a lever gear of the prior art. The present invention also includes a cam with a cam slot formed on only one surface so that the present invention may be made by relatively simple construction, particularly without restriction on design such as the lever gear residing adjacent the intermediate gear to interlock therewith as in the prior art.

Although the invention has been described in its preferred form with a certain degree of particularity, it is understood that the present disclosure of the preferred form can be changed in the details of construction and the combination and arrangement of parts may be resorted to without departing from the spirit and the scope of the invention as herein claimed.

The embodiments of the invention in which an exclusive property or privilege is claimed are defined as follows:

I claim:

1. A loading gear driving apparatus of a video cassette tape recorder comprising:
   a cam including a spiral cam slot on its lower surface;
   an activating plate having a first engaging pin adapted to engage said cam slot, and guiding slots and to enable said activating plate to slidably move on guiding pins fixed on a base plate;
   a sector gear including a gear portion along one end of said sector gear and a rectilinear contact portion and curved engaging portion at a second end of said sector gear, interlocked with a loading gear and mounted on an axial pin fixed on the base plate;
   an auxiliary plate mounted on said axial pin upon said sector gear and having a curved engaging portion, rectilinear contact portion , and protrusion along its peripheral surface; and
   means for interconnecting said auxiliary plate protrusion and a protrusion fixed on said sector gear with a biasing force, said auxiliary plate having an arcuate slot adapted to enable said plate to slidably move on a guiding pin fixed on said sector gear with said axial pin in the center, said activating plate having a second engaging pin adapted to engage between said sector gear and said auxiliary plate engaging portions and to move along said sector gear and said auxiliary plate rectilinear contact portions, whereby said activating plate first engaging pin moves along said cam slot and causes said activating plate second engaging pin to engage either said sector gear curved engaging portion for rotating a loading gear in a first direction or said auxiliary plate curved engaging portion for rotating a loading gear in a second direction.

* * * * *